(No Model.)
E. A. WINANS.
Tucking and Plaiting Scale for Sewing Machines.
No. 243,027. Patented June 14, 1881.
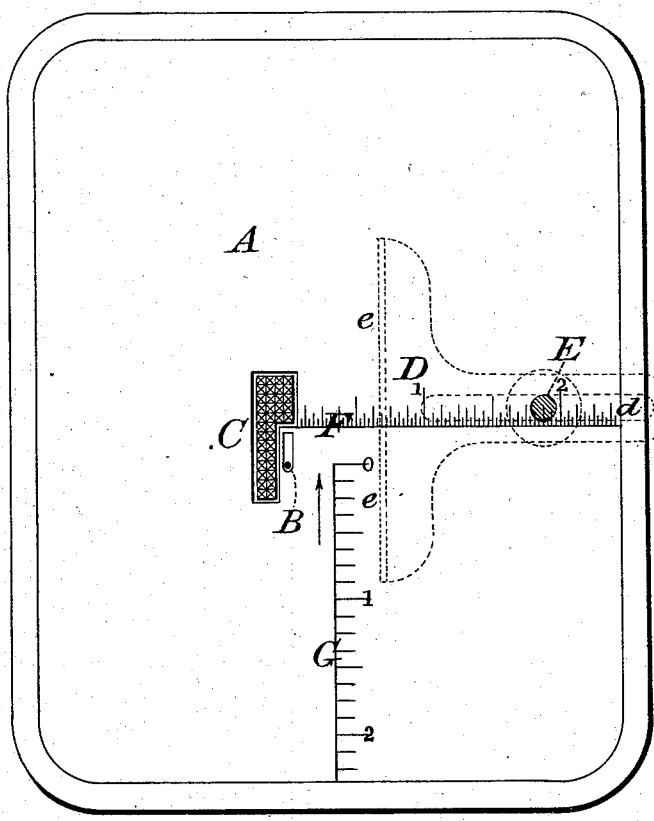
Witnesses:
Walter C. East
Mrs. K. Lockwood French,
Inventor:
Emeline A. Winans.
per Frank L. Pope,
Attorney.

UNITED STATES PATENT OFFICE.

EMELINE A. WINANS, OF NEW YORK, N. Y.

TUCKING AND PLAITING SCALE FOR SEWING-MACHINES.

SPECIFICATION forming part of Letters Patent No. 243,027, dated June 14, 1881.

Application filed July 27, 1880. (No model.)

*To all whom it may concern:*

Be it known that I, EMELINE A. WINANS, a citizen of the United States, residing in the city, county, and State of New York, have invented certain new and useful Improvements in Tucking and Plaiting Scales for Sewing-Machines, of which the following is a specification.

The object of my invention is to provide a means whereby the cloth-guide of a sewing-machine may be more conveniently and accurately adjusted for the purpose of sewing hems, seams, or tucks than has hitherto been possible, and without the necessity of making use of a special measuring-instrument for the purpose, together with a similar means whereby the operator, while plaiting, may determine the breadth of each plait without the trouble and inconvenience of applying a measure thereto.

My invention consists in permanently affixing to the upper surface of the cloth-plate of a sewing-machine two graduated scales of equal parts, progressively numbered from the axis of the needle as a zero-point, one of said scales being placed perpendicular to the direction in which the cloth is moved by the action of the feed mechanism, and the other parallel to the direction of the feed and at right angles to the first-mentioned scale.

The accompanying drawing represents my invention as applied to the cloth-plate of a sewing-machine. The cloth-plate shown is similar to that of the machine which is known as Willcox & Gibbs; but I remark that it is equally well applicable to any other one of the various kinds of sewing-machines in common use.

In the drawing, A represents the horizontal cloth-plate of a sewing-machine as viewed from above.

B is the vertical reciprocating needle, and C is the feed-surface, which forces the cloth to move across the plate A in the direction indicated by the arrow, while the stitches are made therein by the action of the needle B, in a manner well understood.

D is the cloth-guide, (shown in dotted lines,) which is provided with a slot, $d$, through which passes a clamping-screw, E. This arrangement allows the guide D to be clamped to the surface of the cloth-plate with its face $e$ at any required distance from the needle B, so that the line of stitches will be formed at a corresponding distance from the edge of the cloth which runs along the face of the guide.

I affix a graduated scale, F, to the upper surface of the cloth-plate, the divisions of which commence at the plane of the needle B and extend in a direction perpendicular to the line of the direction of the feed toward the edge of the cloth-plate, passing under the guide D. This scale F may be stamped, engraved, etched, or otherwise affixed to the cloth-plate, and may be graduated in any convenient manner. I prefer to make use of inches divided into sixteenths and numbered progressively, starting from the plane of the needle as zero. When thus arranged in connection with the scale it is obvious that the guide D may be adjusted with the utmost facility at any required distance from the needle, as indicated by the division of the scale F, so as to accommodate itself to the requirements of the work to be done. In cases where it is necessary to temporarily discontinue a piece of work and to resume it again after having altered the position of the guide D, the graduated scale greatly facilitates the readjustment of the guide precisely in its former position.

I also provide a second scale, G, upon the surface of the cloth-plate, perpendicular to the scale F and parallel to the edge of the cloth as it is drawn forward by the feed-movement. This scale need not, in general, be graduated so finely as the one first described. It serves a useful purpose in assisting in the operation of plaiting by enabling the operator to fold the plaits to any desired breadth, as indicated by the divisions of the scale, which is in a convenient position for the purpose. In the drawing this scale is represented as extending in one direction only from the needle B, which will ordinarily be found sufficient; but in applying my invention to a sewing-machine having a reversible feed-motion it will be found advantageous to extend this scale in both directions from the needle entirely across the surface of the cloth-plate.

For some purposes it might be sufficient to place a graduated scale upon the upper surface of the cloth-guide D, which would enable the latter to be adjusted with some facility;

but I have found it preferable in practice to place it upon the cloth-plate in the manner which has been described.

I do not claim herein the combination of a scale of equal parts upon the cloth-plate, extending from the plane of the needle in a direction perpendicular to the direction of the feed.

I claim as my invention—

1. The combination, substantially as hereinbefore set forth, of the cloth-plate with the graduated scale upon the upper surface thereof, parallel to the direction of the feed.

2. The cloth-plate of a sewing-machine, constructed, substantially as hereinbefore set forth, with two graduated scales perpendicular to each other, intersecting at the vertical axis of the needle.

Signed by me this 24th day of July, A. D. 1880.

EMELINE A. WINANS.

Witnesses:
J. A. HYLAND,
FRANK L. POPE.